Nov. 4, 1952  H. A. DELL ET AL  2,616,960
CIRCUIT ARRANGEMENT FOR TRANSMITTING AN ALTERNATING
VOLTAGE THROUGH A TRANSMISSION CIRCUIT UNDER THE
CONTROL OF A UNIDIRECTIONAL CONTROL VOLTAGE
Filed April 3, 1950  4 Sheets-Sheet 1

INVENTORS
HUGH ALEXANDER DELL
KENNETH MONTAGUE CAPLE
CLIFFORD HENRY JAMES BEAVEN.

BY Fred M. Vogel
AGENT

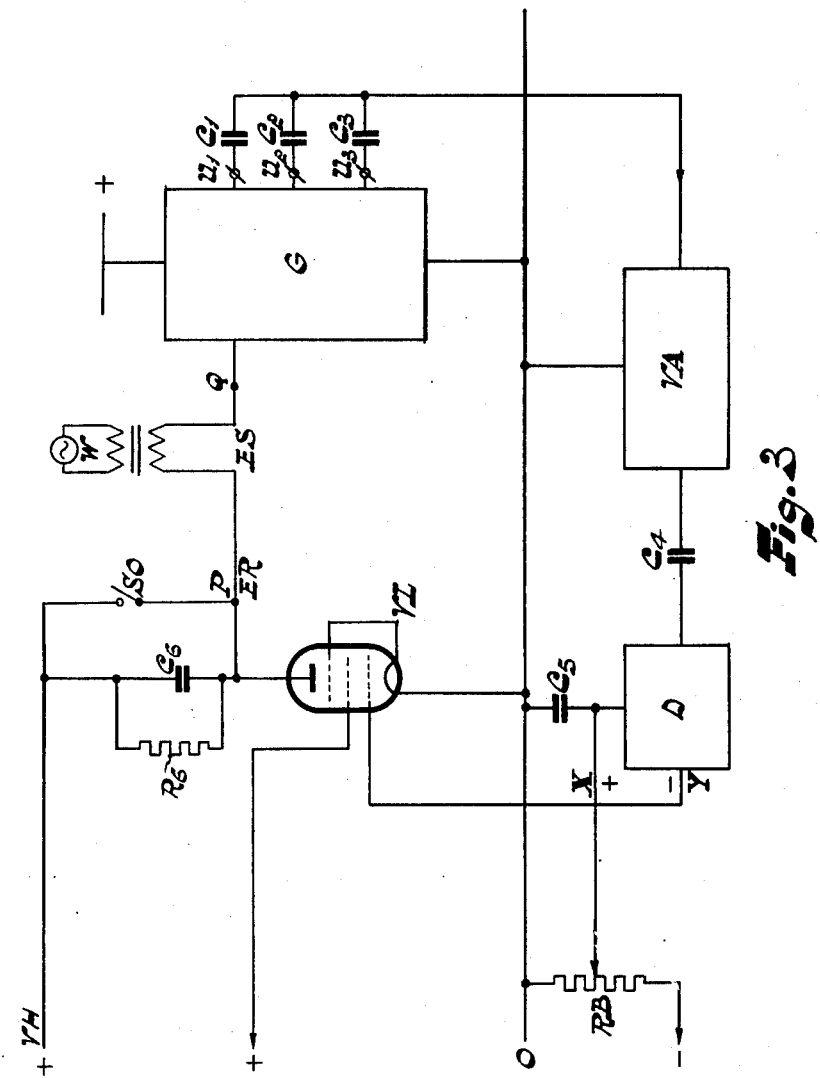

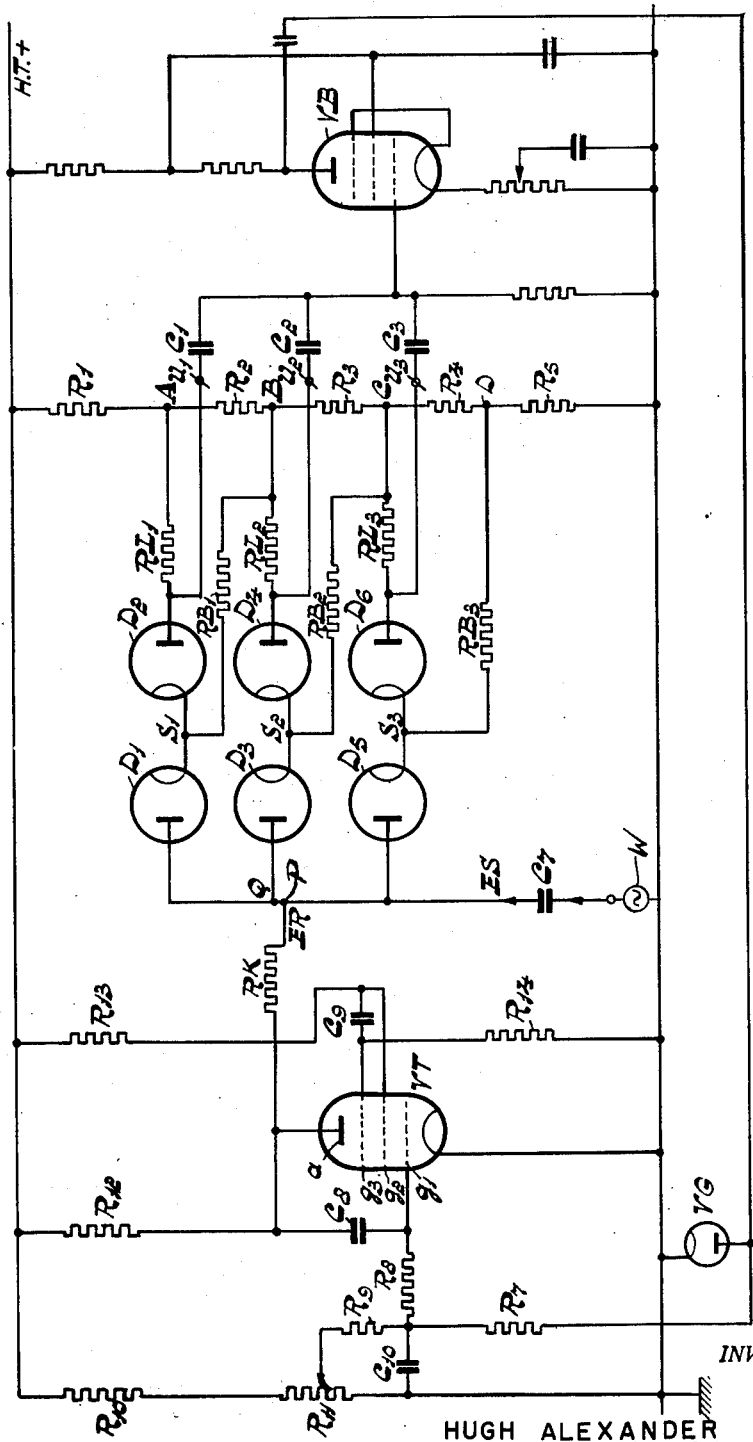

Patented Nov. 4, 1952

2,616,960

UNITED STATES PATENT OFFICE 2,616,960

CIRCUIT ARRANGEMENT FOR TRANSMITTING AN ALTERNATING VOLTAGE THROUGH A TRANSMISSION CIRCUIT UNDER THE CONTROL OF A UNIDIRECTIONAL CONTROL VOLTAGE

Hugh Alexander Dell, Kenneth Montague Caple, and Clifford Henry James Beaven, Salfords, near Redhill, England, assignors to Hartford National Bank and Trust Company, Hartford, Conn., as trustee Application April 3, 1950, Serial No. 153,588
In Great Britain April 4, 1949

5 Claims. (Cl. 177—380)

This invention relates to circuit-arrangements for transmitting an alternating voltage through a transmission circuit under the control of a direct control-voltage.

The circuit-arrangement according to the invention is characterised in that the transmission circuit includes the series combination of two rectifiers connected to have opposite polarities, the control-voltage being operative in a circuit including the series combination of the rectifiers and a first resistance, and the series combination of one rectifier and of the first resistance being shunted by the series combination of a second resistance and a source of direct voltage, which has a polarity such that the last mentioned rectifier is conducting when the other rectifier is cut off, and the resulting voltage drop across the first resistance being greater than the amplitude of the alternating voltage to be transmitted. The transmission of alternating voltage takes place only if both rectifiers are conducting and this is only the case if the direct control-voltage has a value comprised between two determined limiting values. Such a circuit element thus operates as a gate circuit. If the control-voltage is lower than the lower limiting value or higher than the higher limiting value, the alternating voltage is not transmitted and hence the gate is closed. When the gate is open, alternating-voltage signals may be transmitted by way of the rectifiers in both directions.

According to the further invention, a plurality of gate circuits may be combined in such manner that the series combinations comprising two rectifiers connected to have opposite polarities and a first resistance associated with the individual transmission circuits, are included between a common point and points of fixed potentials and mutually different potentials, the direct control-voltage being supplied to the common point.

Each gate may alternately be opened at will by variation of the direct control-voltage. Such a circuit-arrangement is advantageously applicable as a line finder or a dialling switch in an automatic telephone system. Furthermore this switch lends itself more particularly for use as a transmitter- or receiver distribution switch in a multiplex telephone system.

The present invention furthermore provides a circuit-arrangement which may be in electrical conditions which are stable by nature, the distributing circuit being used in this circuit-arrangement. Arrangements of this kind are used inter alia in calculating machines for counting pulses or in a register in an automatic signalling system for fixing dialling signals.

In order that the invention may be more clearly understood and readily carried into effect, it will now be described more fully by reference to the accompanying drawing.

Fig. 3 shows a circuit-arrangement which may be in a plurality of different electrical conditions.

Fig. 6 shows a circuit-arrangement comprising a discharge tube connected as a transitron, for controlling a distributing switch in a multiplex system.

Figure 1:
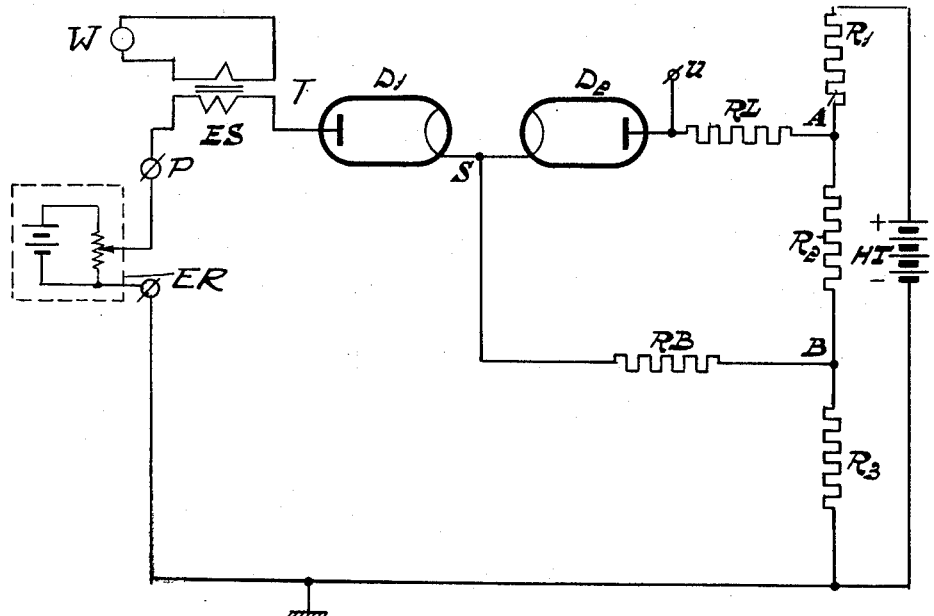
Fig. 1 shows one example of the circuit-arrangement according to the invention.

The circuit-arrangement shown in Fig. 1 comprises two diodes $D_1$ and $D_2$, the cathodes of which are interconnected. Resistances $R_1$, $R_2$ and $R_3$ constitute a voltage divider of low impedance between the terminals of a battery HT. A resistance RL is included between the anode of diode $D_2$ and a tapping point A on the voltage divider, the junction S of the cathodes being connected by way of a resistance RB to a tapping point B on the voltage divider. The diode has a low internal resistance with respect to the resistances RL and RB, the value of resistance RB being, for example, four times that of resistance RL.

If the voltage of point A is 20 volts and the voltage of point B is 10 volts, a current will flow, if the diode $D_1$ is cut off, from point A through resistance RL, diode $D_2$ and resistance RB to the point B, so that the voltage of the anode of $D_2$ will be 18 volts.

The anode of diode $D_1$ has supplied to it the superposition of an alternating voltage ES, which is generated by an alternating-voltage source W and transmitted by a transformer T, and a controllable direct-voltage ER. The voltage ER at the point P may be derived, for example, from a potentiometer by way of the battery HT. The amplitude of the alternating voltage ES is small with respect to the voltage drop across the resistance RL and hence in the example under consideration small with respect to 2 volts. If the voltage of point P is lower than the voltage of point S and hence lower than 18 volts, the diode $D_1$ is cut off and alternating voltage is not transmitted to an output terminal U of the circuit which is connected to the anode of $D_2$. If, however, the voltage of point P is increased to above 18 volts, the diode $D_1$ becomes conducting. The direct voltage of point S in this case substantially equals the voltage of point P. If this voltage is comprised between 18 volts and 20 volts, the diode $D_2$ is also conducting and the alternating voltage is transmitted through the two conducting rectifiers to the point U. As a matter of fact, the transmitted alternating voltage may, instead of being taken from point U, be derived from a transformer connected in series with the diode $D_2$. It is evident that, if both diodes are conducting, an alternating voltage may alternatively be transmitted through the diodes in the reverse direction, that is to say from the terminal U to the transformer T.

When the control-voltage ER is increased to above 20 volts, the voltage of the cathode of $D_2$ becomes higher than that of the anode, so that this diode is cut off and the transmission circuit for the alternating voltage interrupted.

The circuit-arrangement thus operates with respect to the alternating-voltage transmission as a switch of which the transmission contact is constituted by the series-connected diodes and which is controlled by a control-voltage which is operative in series with the transmission circuit.

Figure 2:
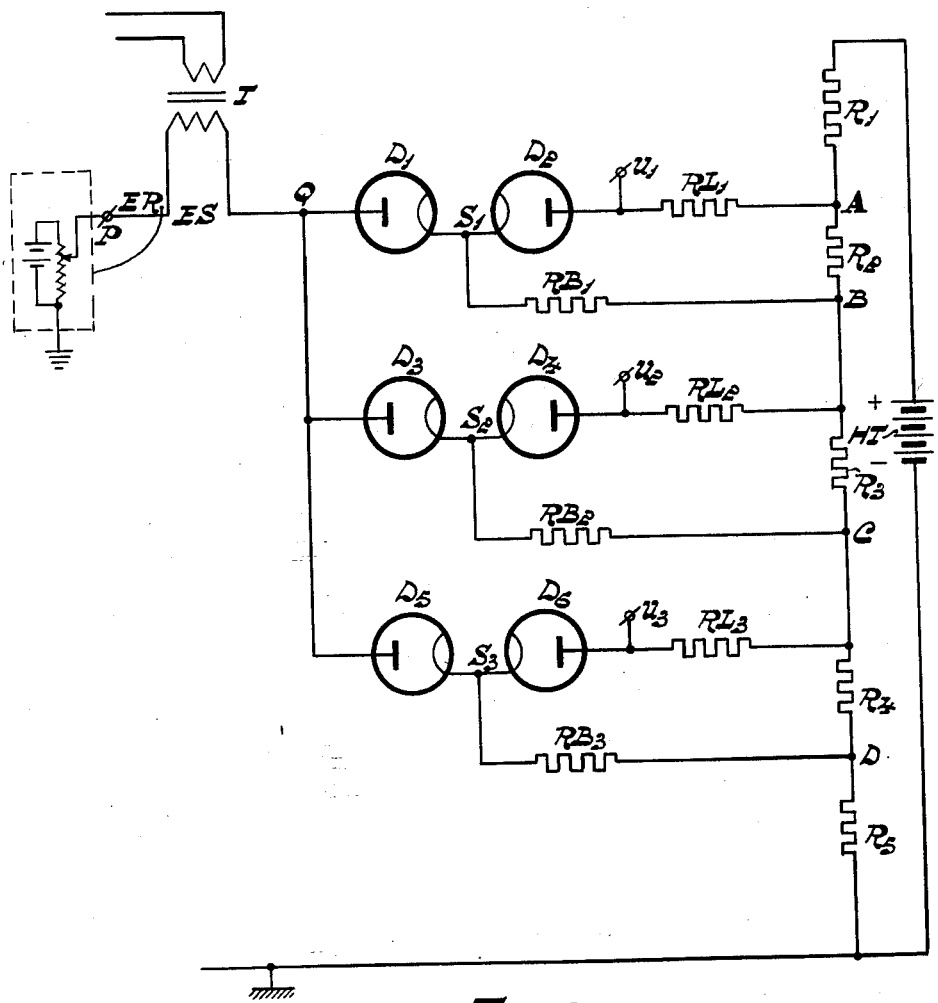
Fig. 2 shows a circuit-arrangement in which a plurality of elementary gate circuits are combined to form a distributing circuit.

Fig. 2 shows the distributing circuit having three channels which are realised as transmission circuits of the type described with reference to Fig. 1.

The anodes of the diodes $D_2$, $D_4$, $D_6$ are connected by way of resistances $RL_1$, $RL_2$, $RL_3$ to tapping points A, B and C on the voltage divider constituted by $R_1$, $R_2$, $R_3$, $R_4$, $R_5$. The junctions $S_1$, $S_2$, $S_3$ of the cathodes of the diode pairs $D_1$, $D_2$; $D_3$, $D_4$ and $D_5$, $D_6$ are connected by way of resistances $RB_1$, $RB_2$ and $RB_3$ to the tapping points B, C and D on the voltage divider.

If it is assumed that the potentials of the points A, B, C and D are 40 volts, 30 volts, 20 volts and 10 volts respectively and that the value of the resistances RB are four times those of the resistances RL, the potentials of the points $S_1$, $S_2$ and $S_3$ will be 38 volts, 28 volts, and 18 volts, if the rectifiers $D_1$, $D_3$ and $D_5$ are cut off.

If the voltage of the point P which is connected to the anodes of $D_1$, $D_3$ and $D_5$ is lower than 18 volts, these rectifiers are cut off and the rectifiers $D_2$, $D_4$ and $D_6$ are conducting. If the potential of point P lies between 18 volts and 20 volts, the rectifiers $D_5$ and $D_6$, as the rectifiers $D_2$ and $D_4$, are conducting, but the rectifiers $D_1$ and $D_3$ are cut off. Consequently, an alternating voltage may be transmitted from the transformer T to the point $U_3$ or in the reverse direction, but no longer to or from either of the points $U_1$ and $U_2$.

If the voltage of the point P has a value comprised between 20 volts and 28 volts, the rectifiers $D_1$, $D_3$ and $D_6$ are cut off and the rectifiers $D_2$, $D_4$ and $D_5$ are conducting so that transmission of alternating current cannot take place. Similarly, the diode pairs $D_3$, $D_4$ and $D_1$ respectively are simultaneously conducting if the voltage of the control point P lies between 28 volts and 30 volts or between 38 volts and 40 volts, alternating voltage not being transmitted through any of the channels, if the control-voltage is comprised between 30 volts and 38 volts or exceeds 40 volts. By a suitable choice of the control-voltage at the point P, the point Q may thus be connected for alternating voltage to one of the points $U_1$, $U_2$ or $U_3$.

It is evident that the number of channels may be increased at will by the addition of further pairs of diodes. A circuit of this kind may be used, for example, as a dialling switch in an automatic signalling system, but lends itself more particularly for use as a distributing switch in a multiplex telephone system, since switching takes place substantially without inertia. With a transmitter distributing switch the individual speech channels are connected to the points U, the common transmission channel being coupled to the point Q. By supplying to point P a periodically varying voltage, for example a sawtooth voltage, the individual speech channels are successively connected for a short period to the common transmission channel.

A similar distributing switch is used at the receiving end, the common transmission channel likewise being connected to the point Q and the individual speech channels being connected to the points U. By supplying a voltage to the point P of the receiver distributing switch, which voltage varies isochronously with that of the transmitter switch, corresponding points U at the receiving end transmitting sides are simultaneously connected to the transmission channel and the transmission of speech may take place in a manner otherwise known per se.

The efficiency of such systems may be considerably improved by providing that the "code time," that is to say the time during which one channel is switched over to a subsequent channel and hence all the channels are cut off, is as short as possible with respect to the time during which a channel is connected to the transmission path. In the case under consideration a stepwise-varying control-voltage is preferably used instead of a sawtooth control-voltage.

Such a voltage may be obtained with the circuit-arrangement shown in Fig. 3. In this arrangement G indicates diagrammatically a circuit as shown in Fig. 2, of which the points $U_1$, $U_2$, $U_3$ are coupled by way of condensers $C_1$, $C_2$, $C_3$ to the input side of an alternating current amplifier VA (shown diagrammatically), which may be of a conventional type. The alternating output voltage of the amplifier VA is supplied by way of a condenser $C_4$ to a rectifier D (shown diagrammatically), of which the direct output voltage occurs between the points X and Y and controls the current flowing through a discharge tube VL. A direct voltage set up across a condenser $C_5$ is superposed on the direct voltage generated by the rectifier D and supplied to the control grid of VL, said direct voltage being adjustable with the use of the potentiometer RB to a value such that the tube VL is, normally, conducting but is cut off if the rectifier D supplies a direct output voltage.

A resistance $R_6$ and condenser $C_6$ are connected between the anode of tube VL and the positive terminal 4 of a battery (not shown), the voltage of which is equal to VR, the anode furthermore being connected with the point P, which corresponds to the point P on the circuit-arrangement shown in Fig. 2.

Figure 4:
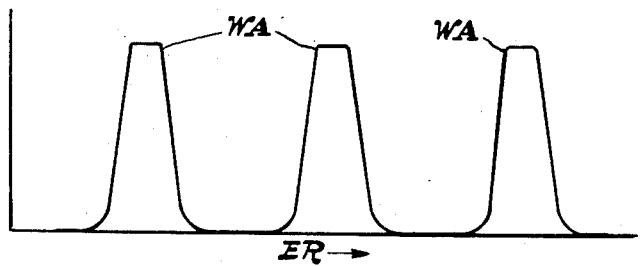
Figs. 4 and 5 show diagrams serving to explain the operation of the circuit-ararngement of Fig. 3.
Figure 5:
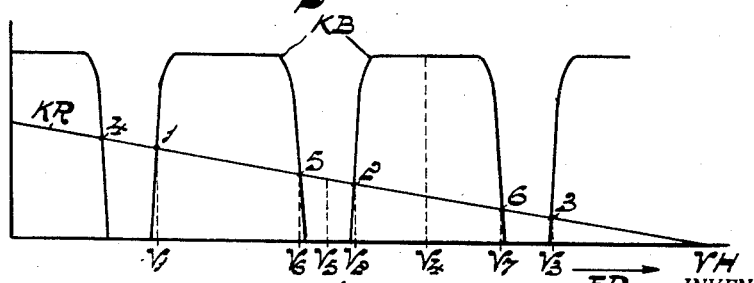

If the voltage ER of the point P is varied from a low value to a high value, then in a manner as described with reference to Fig. 2, the diode pairs $D_5$, $D_6$; $D_3$, $D_4$ and $D_1$, $D_2$ will successively become conducting in the circuit G and the alternating voltage ES will be transmitted by way of the distributing circuit G, the condenser $C_1$, $C_2$ or $C_3$ and the amplifier VA to the rectifier D, the tube VL being cut off each time under control of the direct output voltage of D. The variation of the alternating-voltage amplitude WA supplied to the rectifier D will then exhibit, as a function of the control-voltage ER, the variation as shown by the curve in Fig. 4 and the anode current of tube VL, together with the direct current flowing through the circuit G, which current is otherwise negligible with respect to the anode current, will thus have a variation as a function of the control-voltage ER which is shown by the curve KB in Fig. 5. On the other hand, the relation between the direct current through the resistance $R_6$ and the voltage ER is given by the curve KR shown in Fig. 5.

If the voltage of the point P is equal to the battery voltage VH, the current flowing through the resistance is zero and with decreasing voltage of the point P, the current through $R_6$ increases. So long as the current through the resistance and the anode current are different, the condenser $C_6$ is charged and discharged due to the difference in current. If, for example, the voltage of the point P at a given moment is equal to $V_4$, the anode current is greater than the current through the resistance $R_6$ and the condenser $C_6$ is charged in the negative sense so that the voltage of the point P decreases, which decrease continues till the difference in current has disappeared and the voltage is equal to $V_2$, corresponding to the intersection 2 of the curves KB and KR. If, on the other hand, the control-voltage at a given moment would be equal to $V_5$, the current through the resistance exceeds the current through the tube VL and the condenser $C_6$ is discharged, the voltage increasing till the value $V_2$ is attained. Consequently, if the control-voltage is equal to $V_2$, the circuit-arrangement is in a condition of stable-electric equilibrium.

For the same reason the voltages $V_1$ and $V_3$, which correspond to the intersections 1 and 3 of the curves KR and KB, provide electric-stable conditions of the circuit-arrangement. The circuit-arrangement is only in labile equilibrium, however, at voltages corresponding to the intersections 4, 5 and 6.

The circuit-arrangement may be changed from one condition of stable equilibrium into another by suppressing the transmission of alternating current for a short time, for example by cutting off the amplifier VA in a suitable manner by means of a pulse. The tube VL thus becomes wholly conducting and charges the condenser $C_6$ so that the control-voltage varies in the negative sense. If the control-voltage is initially equal to $V_3$, the pulse supplied must be of such duration that ER varies into a value comprised within the interval between the voltages $V_6$ and $V_7$, which correspond to the intersections 5 and 6 of the curves KR and KB in Fig. 5. At the end of a pulse, ER will assume the value $V_2$, as shown in the foregoing, and will retain this value till a subsequent pulse is supplied, which varies ER into the value $V_1$. By periodically supplying pulses in this manner, the circuit-arrangement traverses successively all the conditions of equilibrium and ER varies in a stepwise manner. After the last condition of equilibrium is reached, the condenser $C_6$ must rapidly be discharged and for this purpose use may be made of a suitable tube discharging device. Such a device is indicated symbolically by SO in Fig. 3 and may be realised, for example, with the use of a gaseous tube.

The device shown in Fig. 3 may be used for controlling a dialling switch or a distributing switch by means of the control-voltage ER. The voltages $V_1$, $V_2$ etc. must in this case be chosen in conformity with the voltages at which a channel of the dialling switch or distributing switch is conducting. However, it is also possible to provide that the device G included in the stabilising circuit of Fig. 3 simultaneously operates as a dialling or distributing switch. The circuit shown in Fig. 3 is furthermore suitable for use as a counting circuit in a calculating machine or in a register for automatic telephony, since the value of the control-voltage ER is characteristic of the number of pulses supplied to the circuit.

The stable conditions of equilibrium may alternatively be traversed in the opposite directions, for example by cutting off the tube VL for a short period by means of pulses, in which event the circuit also permits of arithmetic subtraction. It is evident that the circuit may also be so arranged that the tube VL is, normally, cut off and becomes conducting if an alternating voltage is supplied to the rectifier D. In this case the polarity of the rectifier D must be reversed. For counting large numbers of pulses, a plurality of devices as shown in Fig. 3 may be connected in cascade, the pulses to be counted being supplied to a first device and a pulse being transmitted to a subsequent device upon each discharge of the condenser $C_6$.

Fig. 6 shows a circuit-arrangement which permits of generating a voltage which automatically varies in a stepwise manner. The arrangement comprises a transmission circuit of the type described with reference to Fig. 2 and of which identical elements are indicated by the same reference numerals. The common point P of the transmission circuits $D_1$, $D_2$, $D_3$, $D_4$, $D_5$, $D_6$ is connected by way of a condenser $C_7$ to an alternating-voltage supply (not shown), which provides an alternating voltage ES. The output terminals $U_1$, $U_2$ and $U_3$ of the transmission circuits are connected by way of condensers $C_1$, $C_2$, $C_3$ to the control grid of an amplifying tube VB, by which the alternating voltages transmitted under the control of the direct control-voltage ER are amplified and supplied to a diode rectifier VG. Consequently the amplitude of the alternating voltage supplied to the tube VG will, as a function of ER, have the variation as shown by the curve WA in Fig. 4. The direct voltage produced by the rectifier VG has a similar shape and, after having been smoothed in known manner by resistance $R_7$ and condenser $C_{10}$, is supplied with negative polarity by way of resistance $R_8$ to the control grid $g_1$ of the pentode tube VT, which is connected as a Miller-transitron. The control grid $g_1$ is furthermore connected by way of resistances $R_8$ and $R_9$ to the tapping point A on a voltage divider constituted by resistances $R_{10}$ and $R_{11}$. The anode $a$ of tube VT is fed by way of a resistance $R_{12}$ and connected by way of condenser $C_8$ to the control grid $g_1$, the anode furthermore being connected by way of the coupling resistance RK to the common point of the transmission circuits. A suppressor grid $g_3$ is connected by way of a resistance $R_{14}$ to the cathode of the tube, a screen grid $g_2$ being fed by way of a resistance $R_{13}$ by the positive voltage source HT. Furthermore, a condenser $C_9$ is included between the screen grid $g_2$ and the suppressor grid $g_3$.

The operation of the transitron circuit is as follows. It is assumed that at a given moment the potential of the control grid $g_1$ is so much negative with respect to the cathode that the tube is completely cut off. In this case there is no flow of anode- and screen-grid current and the voltages of the anode and of the screen grid are equal to the voltage of the source of supply HT, the suppressor grid $g_3$ having the same potential as the cathode. The control grid is rapidly charged in the positive sense by way of the resistances $R_8$ and $R_9$ till a voltage is attained at which the tube just becomes conducting and anode current starts to flow, in which event the anode voltage decreases and the condenser $C_8$ discharges. This voltage drop is transmitted by the condenser $C_8$ to the control grid so that the increase in voltage of the control grid is greatly counteracted and the anode current can increase only comparatively slowly. Consequently, the voltage ER decreases substantially linearly until a value is attained at which the first transmission circuit $D_1$, $D_2$ becomes conducting and the alternating voltage ES is transmitted to the rectifier VG. The direct voltage generated by the rectifier counteracts the increase in voltage of the control grid $g_1$ to an even much greater extent so that the anode current can increase but very slowly until ER has attained a value at which the first transmission circuit is again cut off.

A more rapid increase then follows until, under the control of the control-voltage ER, the second transmission circuit is closed and the increase in anode current again counteracts the direct voltage generated by VG. This results in a decrease in control-voltage ER which is alternately slow and less slow.

After all the transmission circuits have successively become conducting once, the anode voltage has ultimately decreased to such extent that a considerable part of the emission current flows to the screen grid $g_2$. This results in a decrease of the screen-grid voltage and, due to the back-coupling through condenser $C_9$, also in a decrease in voltage of the suppressor grid $g_3$ so that this grid becomes negative with respect to the cathode to such extent that the anode current greatly decreases and an even greater part of the emission current flows to the screen grid. This results in a further decrease of the screen-grid voltage so that the suppressor grid $g_3$ becomes negative to such extent that the anode current is cut off almost completely.

A positive pulse is supplied by way of the coupling via condenser $C_8$ to the control grid of such strength that this grid becomes positive with respect to the cathode and grid current starts to flow. Consequently, the condenser $C_8$ is charged in a negative sense so that after the end of the pulse the control grid becomes greatly negative with respect to the cathode and the emission current is completely cut off, whereafter the initial position is reached again.

The control-voltage ER permits of controlling a distributing switch in a multiplex telephone system. However, it is also possible to utilise the distributing circuit comprising the diodes $D_1$—$D_2$ itself as such a distributing switch. In this case the frequency of the auxiliary alternating voltage must be much higher than the maximum possible speech frequency to be transmitted and the condensers $C_1$—$C_3$ must be so proportioned that speech currents are not transmitted to the control grid of tube VB. The individual channels and the common channel may then be connected to the output points $U_1$—$U_3$ and to the point P respectively.

What we claim is:

1. An arrangement for governing by means of a direct control voltage the transmission of an alternating voltage having a predetermined amplitude through a transmission circuit, said arrangement comprising a series network constituted by first and second rectifiers connected in series opposition and a first resistance having one end thereof connected to one end of said second rectifier, means to supply said alternating voltage and said control voltage to said series network, a direct voltage source, and a second resistance connected in series with said source between the junction of said rectifiers and the other end of said first resistance, said source having a polarity and magnitude at which said second rectifier is conductive while said first rectifier is non-conductive to produce a voltage drop across said first resistance which is greater than the predetermined amplitude of said alternating wave.

2. An arrangement for selectively governing by means of a direct control voltage the transmission of an alternating voltage of predetermined amplitude through a plurality of transmission circuits, each circuit including a series network constituted by first and second rectifiers connected in series opposition and a first resistance having one end thereof connected to one end of said second rectifier, the network of said transmission circuits having a common input terminal, means to apply said direct control voltage and said alternating voltage to the common input terminal, a direct voltage source associated with each network, and a second resistance connected in series with each source between the junction of the rectifiers and the other end of the first resistance in the associated network, each source having a polarity and magnitude at which the second rectifier in the associated network is conductive while the first rectifier is non-conductive to produce a voltage drop across the first resistance which is greater than the predetermined amplitude of the alternating voltage, the sources having different magnitudes whereby variation of the control voltage renders the associated circuits sequentially operative.

3. An arrangement as set forth in claim 2, further including means for temporarily interrupting the alternating current transmission.

4. An arrangement, as set forth in claim 2, further including a common rectifier, the alternating voltage transmitted by the transmission circuits being supplied to the common rectifier to produce a direct output voltage, an electron discharge tube having a control electrode and an output electrode, means applying said output voltage to said control electrode, and a third resistance coupling said output electrode to said common input terminal.

5. An arrangement, as set forth in claim 4, adapted to produce a step-wise voltage wherein said electron discharge tube is constituted by a pentode having a cathode, a control grid, a screen grid, a suppressor grid and an anode and wherein said anode is coupled by said third resistance to said common input terminal, and further including a first condenser coupling said control grid to said anode, a fourth resistance, means to apply a positive bias to said control grid through said fourth resistance, a second condenser connecting said suppressor grid to said screen grid, said suppressor grid being connected to said cathode, and means to apply a positive potential to said screen grid.

HUGH ALEXANDER DELL.
    KENNETH MONTAGUE CAPLE.
    CLIFFORD HENRY JAMES BEAVEN.

REFERENCES CITED

The following references are of record in the file of this patent:

UNITED STATES PATENTS

| Number | Name | Date |
| --- | --- | --- |
| 2,413,440 | Farrington | Dec. 31, 1946 |
| 2,556,200 | Lesti | June 12, 1950 |

OTHER REFERENCES

Crosby, Abstract Ser. Number 537,340, published Dec. 20, 1949.